Figure 1:
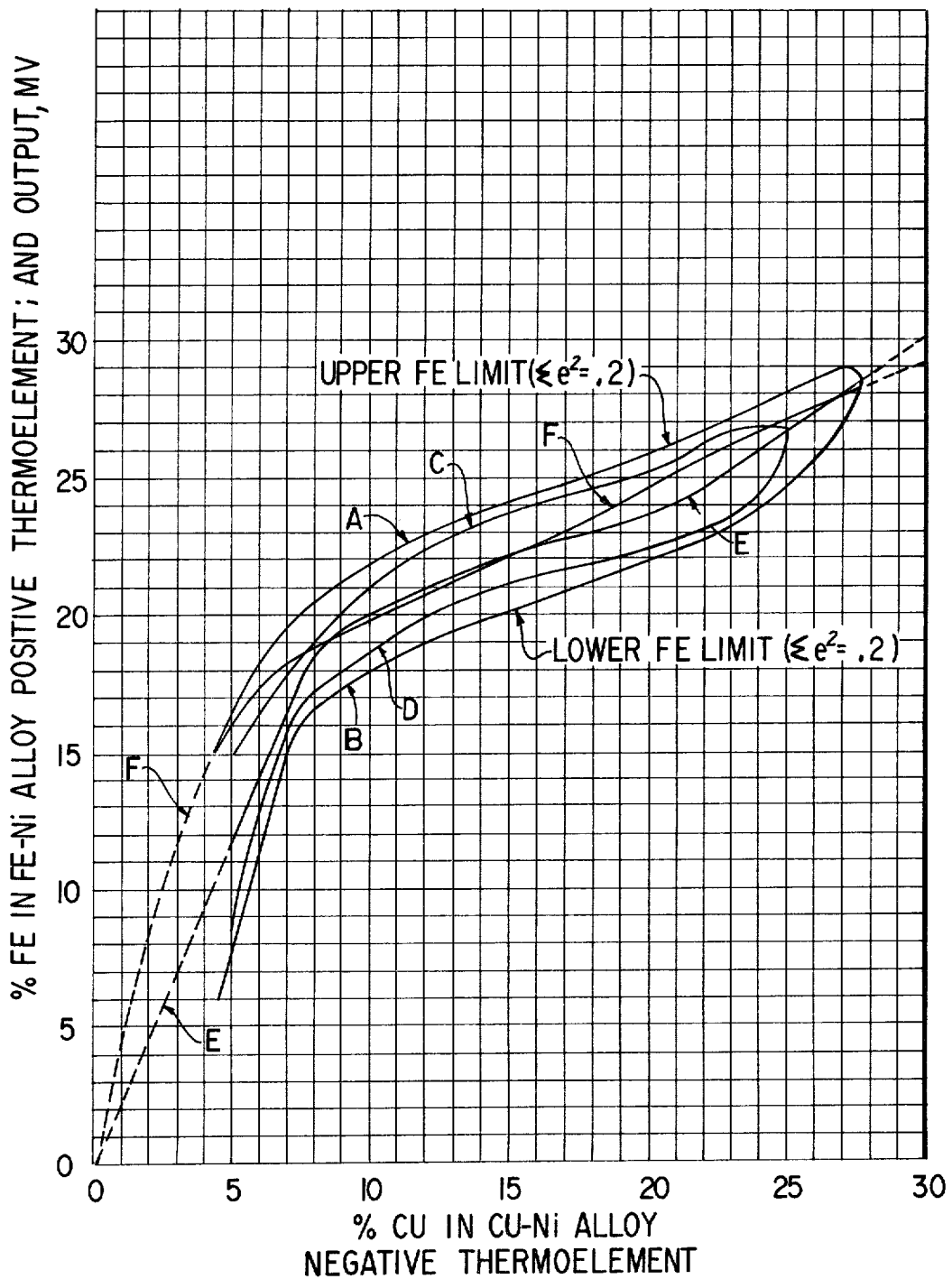

United States Patent [19]
Sibley et al.

[11] 3,901,734
[45] Aug. 26, 1975

[54] THERMOCOUPLE

[75] Inventors: Forbes S. Sibley, Troy; Robert J. Biermann, Sterling Heights, both of Mich.

[73] Assignee: Hoskins Manufacturing Co., Detroit, Mich.

[22] Filed: Aug. 23, 1973

[21] Appl. No.: 390,850

[52] U.S. Cl. ............................................... 136/241
[51] Int. Cl............................................. H01v 1/22
[58] Field of Search ............... 136/236, 241; 73/359

[56] References Cited
UNITED STATES PATENTS

| | | | |
|---|---|---|---|
| 704,595 | 7/1902 | Thwing | 136/241 |
| 2,941,192 | 6/1960 | Postal | 136/241 X |
| 3,154,060 | 10/1964 | Hundere | 136/241 X |
| 3,372,062 | 3/1968 | Livingston | 136/241 X |

*Primary Examiner*—Verlin R. Pendegrass
*Attorney, Agent, or Firm*—Barnes, Kisselle, Raisch & Choate

[57] ABSTRACT

A thermocouple which produces a substantially uniform low output approaching zero at temperatures between 32°F. and 400°–500°F. and a relatively high uniformly increasing output between 1,000°–2,000°F. The electropositive thermoelement consists of an alloy containing about 6–29% iron and the balance essentially nickel. The electronegative element consists of an alloy containing about 4.5–28% copper and the balance essentially nickel.

25 Claims, 3 Drawing Figures

3,901,734

THERMOCOUPLE

This invention relates to a thermocouple and, more specifically, to a thermocouple the output of which between 32° F. and about 500° F. is a uniformly low value which, from the practical standpoint, approaches substantially zero (based on a reference temperature of 32° F.) when the compositions of the positive and negative thermoelements are properly selected.

Most alloys used as thermocouple elements are relatively expensive, not only because of the cost of the alloying elements, but also because their composition must be carefully controlled within relatively narrow limits in order to produce an emf v. temperature curve which lies within acceptable tolerance limitations for designated types of thermocouples. Thus, whenever practical the thermocouple elements themselves are of only sufficient length to extend exteriorly of the space or chamber, the temperature of which is being ascertained, and less expensive lead wires are extended from the ends of the thermocouple elements to the temperature recording instrument.

If the emf output of the lead wires (combined as a thermocouple) corresponds to that of the thermocouple itself up to a temperature of about 400°–500°F. (the lead wire-thermocouple junction does not normally exceed this temperature under most conditions) then there will be no unwanted emf generated at, and therefore no measurement error attributable to, the lead wire-thermocouple junction operating at any uniform temperature within that range.

Generally, however, exact correspondence is lacking between the emf of the lead wires and that of the thermocouple, and as a consequence there exists a net difference in output between the lead wires and the thermocouple at the operating temperature of the lead wire-thermocouple junction. This net difference constitutes an error in the apparent output of the thermocouple measuring junction.

To limit such error to a small value the emf of conventionally used lead wires must be controlled to match fairly closely the emf of the thermocouple up to about 400°–500°F. Such lead wires are therefore relatively expensive.

The need for emf matching can be overcome under certain conditions by maintaining the lead wire-thermocouple junction at a constant temperature, and in particular, at 32°F., where by usual definition the output of thermocouples is zero. In either case ordinary inexpensive copper, aluminum, iron or steel lead wires can be used from that junction to the recording instrument. But where the junction is not at 32° F. a constant extraneous emf will be generated at the lead wire-thermocouple junction as a result of their use and allowance must be made for this emf in the accurate determination of thermocouple output, while in the special case of a junction temperature of 32° F. no extraneous emf is generated and no such allowance is needed. It will be appreciated, however, that in most industrial applications and in numerous other applications the use of a lead wire-thermocouple junction maintained at 32° F. is impractical.

The present invention has for its primary object the provision of a thermocouple which has a uniformly very low emf output (which from the standpoint of many practical applications approaches or can be considered substantially zero or can be disregarded) not only at 32° F. but over a range of temperatures from 32° F. up to about 400°–500° F. This characteristic makes it practical to join inexpensive copper, aluminum or iron lead wires (or other thermoelectrically like pairs of wires which may be used beneficially for reasons such as corrosion resistance) to the thermocouple at any uniform temperature within that range without generating an extraneous emf requiring special consideration.

More specifically, the present invention contemplates a thermocouple in which the positive element consists of an iron-nickel alloy and the negative element consists of a copper-nickel alloy. The compositions of these elements are such that inexpensive lead wires of copper, aluminum or iron (for example) may be used without any significant temperature error where the thermocouple is monitoring a temperature of about 1,600° F. and the lead wire-thermocouple junction is at a temperature not exceeding about 400°–500° F.

Figure 2:
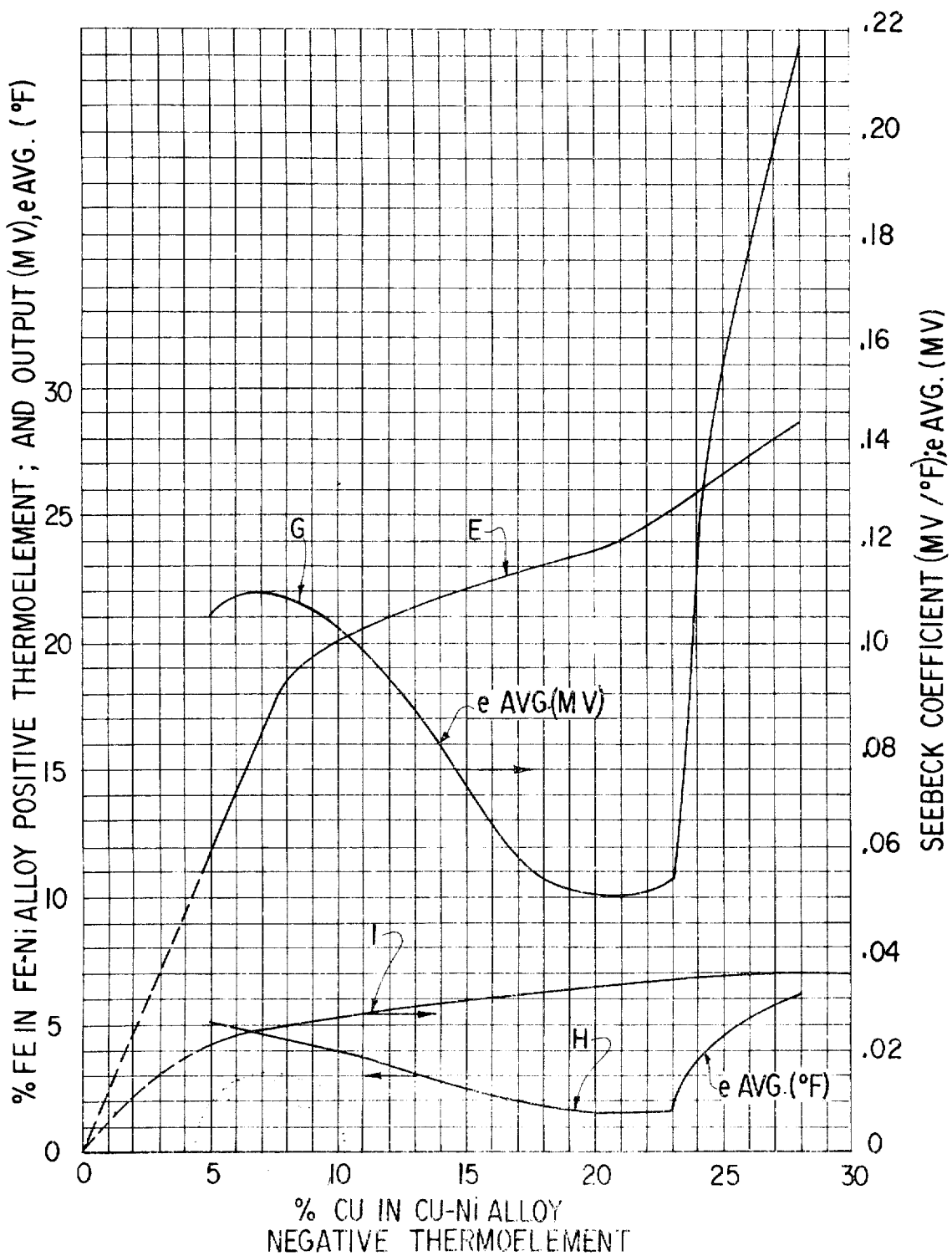
Figure 3:
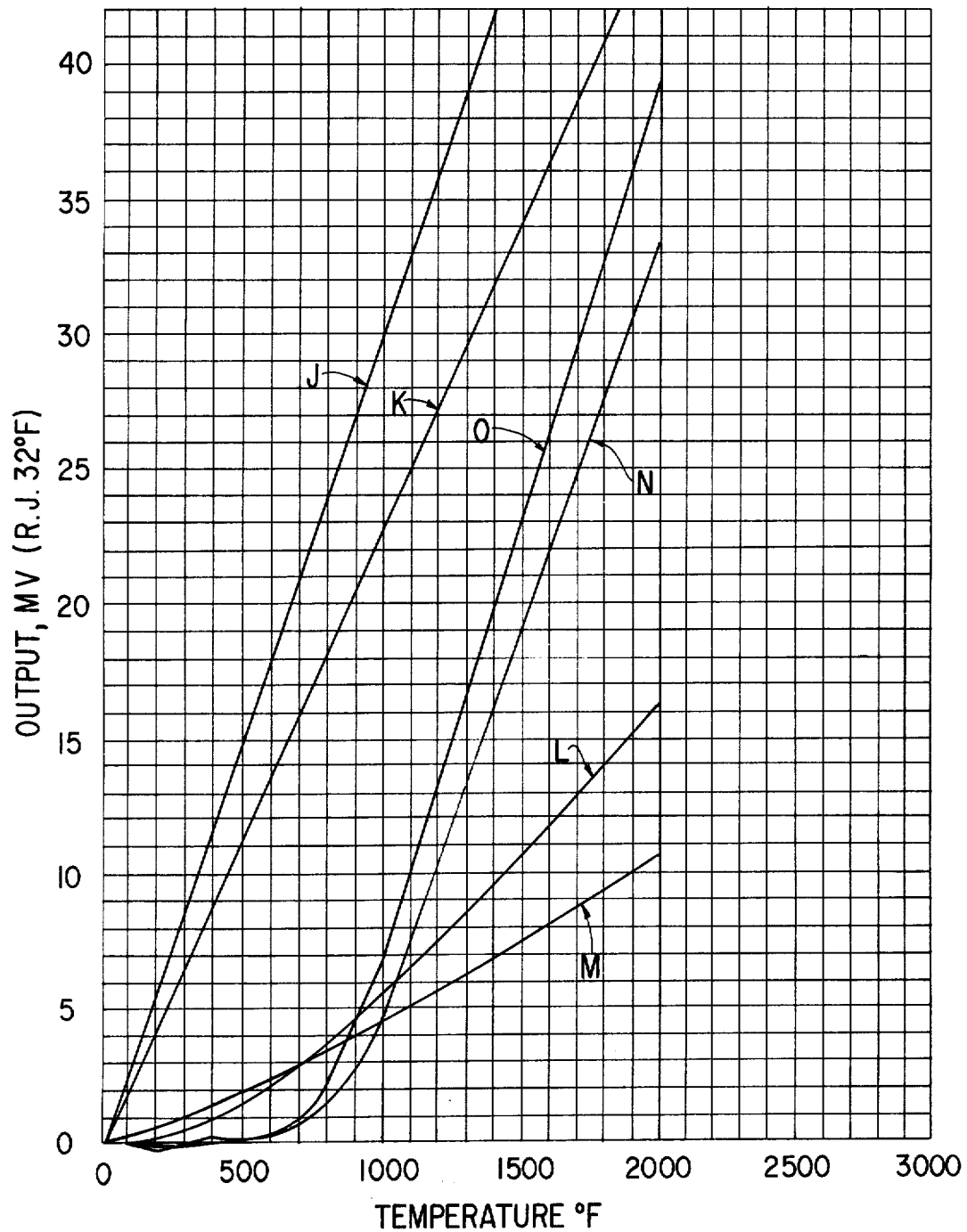

Other features and characteristics of the thermocouple of this invention will become apparent from the following description and figures, in which:

FIG. 1 is a graph showing ranges of compositions for the positive and negative elements of the thermocouple of this invention and the output thereof at 1,600° F.;

FIG. 2 is a graph showing various characteristics of thermocouples according to the present invention; and FIG. 3 is a graph showing the emf-temperature curve of two typical thermocouples of the present invention, the positive and negative legs of each having substantially different compositions falling within an acceptable range and also showing like curves of several commercially available thermocouples.

There are numerous thermocouple applications wherein the temperature being monitored is in the range of 1,000°–2,000°F. and the thermocouple-lead wire junction never exceeds a temperature of about 400°–500°F. One such application is an automotive catalytic exhaust converter used for reducing the emission of objectionable products of combustion into the atmosphere. A thermocouple intended for such use should exhibit a stable emf output at operating temperatures of about 1,000°–1,600°F. Of equal importance is the fact that the thermocouple should exhibit a stable emf output for extended periods of operation at about 1,600°F. with possibly frequent short excursions at higher temperatures up to about 2,000°F. Within the operating temperature range the thermocouple should be capable of withstanding an environment consisting largely of combustion products of automotive fuels which may contain substantial amounts of carbon monoxide and water vapor. When used as a bare wire thermocouple it should be able to withstand short periods of strongly oxidizing conditions at elevated temperatures.

In addition to its emf stability, it is desirable that a thermocouple of the general type referred to produce a substantial emf output at operating temperatures. In many applications, however, a high sensitivity to temperature changes, represented by a high Seebeck coefficient at operating temperatures is of even more importance than high output. As is well understood in the art, the Seebeck coefficient of a thermocouple is the slope of its emf v. temperature curve, or, stated differently, the millivolt change per degree of temperature change.

With respect to a thermocouple specifically designed for use in an automotive catalytic exhaust converter, at start up the thermocouple and related circuitry should operate within acceptable limits of error when temperatures throughout the entire system lie within a range of about −40° to 140° F. Likewise, during continuous operation the thermocouple should perform satisfactorily at lead wire-thermocouple junction temperatures as high as 400°–500° F. As pointed out previously, in order to reduce the cost of thermocouple circuitry the thermocouple should be kept as short as possible and should be capable of operating within acceptable limits of error when it is connected to the instrumentation through pairs of ordinary electrical conductors, such as copper, iron or aluminum wires.

When a thermocouple of the present invention is used in connection with a catalytic converter of an automotive exhaust system, the thermocouple is suitably positioned within the catalytic converter with the free ends of the thermocouple elements extending outwardly of the converter to a location on the automotive vehicle where the operating temperature will not exceed about 400°–500° F. Lead wires are extended from the ends of the thermocouple elements to instrumentation on the vehicle, on the dashboard for example. The instrumentation connected to the thermocouple would be responsive to the temperature within the catalytic converter and would preferably be designed to operate a control mechanism. In any event, the thermocouple elements would be relatively short in comparison to the length of the lead wires.

The thermocouple of the present invention has substantially all of the desirable properties mentioned above. The thermocouple consists of a positive leg of an iron-nickel alloy and a negative leg of a copper-nickel alloy. As pointed out more specifically hereinafter, the composition of each of these legs may vary throughout a relatively wide range. For example, in the positive leg the iron may vary from about 6–29% with the remainder essentially nickel. In the negative leg the copper content may vary from about 4.5–28% with the remainder essentially nickel.

With respect to the desired properties referred to above for a catalytic converter thermocouple, the thermocouple of the present invention is well suited for several reasons. The iron-nickel and copper-nickel alloys are well adapted to service in various combustion atmospheres at temperatures up to more than 2,000°F. Oxides of all three of the basic alloying elements are reducible at elevated temperatures by carbon monoxide and hydrogen, both of which may be present in such atmospheres. Over most of the specified composition range alloys of both types have estimated melting points in excess of 2,500°F. Neither type of alloy appears to undergo any unstabilizing phase changes below its melting point.

The copper-nickel alloys forming the negative thermocouple element are known to be relatively oxidation resistant. The iron-nickel alloys forming the positive thermocouple element may be less oxidation resistant than the corresponding negative element but are capable of withstanding high temperature oxidizing conditions for at least a substantial time period. Both types of alloys display rather stable emf's under alternately oxidizing and reducing conditions. In the event that the thermocouple may be subjected to deleterious concentrations of sulfur and lead compounds, or other corrosive conditions, it can be protected by some means such as a metallic sheath with the ends suitably sealed.

The thermocouple of this invention (based upon a reference temperature of 32° F) produces a very low substantially uniform output at temperatures between 32° F. and 400°–500° F. The actual output of thermocouples of the present invention with various ranges of composition in both the positive and negative legs thereof is set forth in the data reproduced in Table I. In these data the remainder of the alloys in the compositions set forth in the first two columns is substantially all nickel. The designation "$e_{max}$" is the highest output of the couple (disregarding signs) among the four values listed for temperatures of 500° F. and below and the designation "$e_{avg.}$" is the average of the absolute values of those 4 millivolt outputs. The designation "$\Sigma e^2$" designates the sum of the squares of those 4 millivolt outputs.

TABLE I

| P % Fe | N % Cu | OUTPUT OF P/N THERMOCOUPLE, MV: (Ref.Junc. 32°F) | | | | | | $e_{max}$ Mv | $e_{avg.}$ Mv | $\Sigma e^2$ Mv² | Average Slope, Mv/°F 1000°–1600° F. |
|---|---|---|---|---|---|---|---|---|---|---|---|
| | | 200F | 300F | 400F | 500F | 1000F | 1600F | | | | |
| 5.0 | 5.0 | .15 | .10 | .40 | .50 | 3.1 | 11.6 | .50 | .29 | .343 | .0142 |
| 7.5 | 5.0 | .00 | .00 | .25 | .35 | 3.2 | 13.6 | .35 | .15 | .185 | .0174 |
| 10.0 | 5.0 | −.05 | −.10 | .10 | .20 | 3.3 | 15.5 | .20 | .11 | .063 | .0204 |
| 12.5 | 5.0 | −.10 | −.15 | .00 | .15 | 3.3 | 16.2 | ±.15 | .10 | .055 | .0215 |
| 15.0 | 5.0 | −.20 | −.20 | −.10 | .00 | 3.3 | 16.5 | −.20 | .13 | .090 | .0220 |
| 16.0 | 5.0 | −.25 | −.30 | −.15 | −.10 | 3.0 | 16.5 | −.30 | .20 | .185 | .0225 |
| 17.5 | 5.0 | −.35 | −.45 | −.35 | −.30 | 2.6 | 16.4 | −.45 | .36 | .536 | .0230 |
| 20.0 | 5.0 | −.50 | −.60 | −.50 | −.50 | 2.0 | 15.9 | −.60 | .53 | 1.11 | .0232 |
| 10.0 | 7.5 | .10 | .20 | .55 | .60 | 4.3 | 17.6 | .60 | .36 | .712 | .0222 |
| 13.5 | 7.5 | .00 | .15 | .40 | .50 | 4.3 | 18.5 | .50 | .26 | .433 | .0237 |
| 15.0 | 7.5 | −.05 | .10 | .35 | .35 | 4.2 | 18.6 | .35 | .21 | .280 | .0239 |
| 17.5 | 7.5 | −.15 | −.10 | .15 | .15 | 3.6 | 18.5 | ±.15 | .14 | .078 | .0248 |
| 18.5 | 7.5 | −.25 | −.20 | .00 | .00 | 3.3 | 18.3 | −.25 | .11 | .103 | .0250 |
| 20.0 | 7.5 | −.30 | −.30 | −.10 | −.10 | 3.0 | 18.0 | −.30 | .20 | .200 | .0250 |
| 22.5 | 7.5 | −.40 | −.45 | −.30 | −.50 | 2.2 | 17.1 | −.50 | .41 | .702 | .0248 |
| 25.0 | 7.5 | −.55 | −.65 | −.60 | −.85 | 1.6 | 16.3 | −.85 | .66 | 1.80 | .0245 |
| 17.5 | 9.0 | −.05 | .05 | .30 | .25 | 4.2 | 20.0 | .30 | .16 | .158 | .0263 |
| 18.5 | 9.0 | −.10 | −.05 | .20 | .15 | 4.0 | 19.8 | .20 | .13 | .075 | .0262 |
| 19.5 | 9.0 | −.15 | −.10 | .15 | .00 | 3.7 | 19.6 | ±.15 | .10 | .055 | .0265 |
| 20.0 | 9.0 | −.20 | −.15 | .10 | −.05 | 3.6 | 19.5 | −.20 | .13 | .075 | .0265 |
| 21.0 | 9.0 | −.25 | −.20 | .05 | −.25 | 3.3 | 19.1 | −.25 | .19 | .168 | .0263 |
| 15.0 | 10.0 | .00 | .35 | .55 | .60 | 5.1 | 20.4 | .60 | .38 | .782 | .0255 |
| 18.5 | 10.0 | −.05 | .00 | .25 | .20 | 4.1 | 20.1 | .25 | .13 | .105 | .0267 |
| 19.0 | 10.0 | −.10 | .00 | .15 | .10 | 4.0 | 20.0 | .15 | .09 | .043 | .0267 |

TABLE I -Continued

| P % Fe | N % Cu | OUTPUT OF P/N THERMOCOUPLE, MV: (Ref.Junc. 32°F) 200F | 300F | 400F | 500F | 1000F | 1600F | $e_{max}$ Mv | $e_{avg}$ Mv | $\Sigma e^2$ Mv$^2$ | Average Slope, Mv/°F 1000°–1600° F. |
|---|---|---|---|---|---|---|---|---|---|---|---|
| 19.5 | 10.0 | −.10 | −.05 | .20 | .05 | 3.9 | 19.9 | .20 | .10 | .055 | .0267 |
| 20.0 | 10.0 | −.15 | −.10 | .15 | .00 | 3.8 | 19.9 | ±.15 | .10 | .055 | .0267 |
| 20.5 | 10.0 | −.20 | −.10 | .10 | −.10 | 3.6 | 19.6 | −.20 | .13 | .070 | .0267 |
| 21.0 | 10.0 | −.20 | −.15 | .10 | −.20 | 3.5 | 19.5 | −.20 | .17 | .113 | .0267 |
| 22.0 | 10.0 | −.25 | −.20 | −.10 | −.30 | 3.2 | 19.2 | −.30 | .21 | .203 | .0267 |
| 22.5 | 10.0 | −.30 | −.25 | −.10 | −.40 | 3.0 | 18.9 | −.40 | .26 | .323 | .0265 |
| 25.0 | 10.0 | −.40 | −.45 | −.40 | −.70 | 2.4 | 18.1 | −.70 | .49 | 1.01 | .0262 |
| 20.0 | 11.0 | −.15 | −.05 | .20 | .05 | 3.9 | 20.2 | .20 | .11 | .068 | .0272 |
| 18.0 | 12.0 | .05 | .20 | .45 | .35 | 4.9 | 21.6 | .45 | .26 | .367 | .0279 |
| 19.0 | 12.0 | .00 | .10 | .35 | .25 | 4.6 | 21.4 | .35 | .18 | .195 | .0280 |
| 20.0 | 12.0 | −.05 | .05 | .30 | .10 | 4.3 | 21.2 | .30 | .13 | .105 | .0282 |
| 21.0 | 12.0 | −.10 | −.05 | .15 | −.05 | 4.0 | 20.8 | .15 | .09 | .038 | .0280 |
| 22.0 | 12.0 | −.15 | −.10 | .05 | −.20 | 3.8 | 20.5 | −.20 | .13 | .055 | .0279 |
| 23.0 | 12.0 | −.20 | −.20 | −.05 | −.30 | 3.5 | 20.1 | −.30 | .19 | .173 | .0277 |
| 24.0 | 12.0 | −.25 | −.30 | −.15 | −.45 | 3.3 | 19.8 | −.45 | .29 | .375 | .0275 |
| 20.0 | 15.0 | .05 | .20 | .35 | .25 | 5.1 | 22.6 | .35 | .21 | .228 | .0292 |
| 21.0 | 15.0 | .00 | .10 | .20 | .10 | 4.8 | 22.2 | .20 | .10 | .060 | .0290 |
| 22.0 | 15.0 | −.05 | .05 | .10 | −.05 | 4.6 | 21.9 | .10 | .06 | .018 | .0288 |
| 23.0 | 15.0 | −.10 | −.05 | .00 | −.15 | 4.3 | 21.5 | −.15 | .08 | .035 | .0287 |
| 24.0 | 15.0 | −.15 | −.15 | −.10 | −.30 | 4.1 | 21.2 | −.30 | .18 | .145 | .0286 |
| 25.0 | 15.0 | −.20 | −.20 | −.20 | −.45 | 3.8 | 20.9 | −.45 | .26 | .322 | .0286 |
| 20.0 | 18.0 | .05 | .30 | .45 | .40 | 6.0 | 24.6 | .45 | .30 | .455 | .0310 |
| 21.0 | 18.0 | .00 | .20 | .30 | .25 | 6.3 | 24.2 | .30 | .19 | .193 | .0308 |
| 22.0 | 18.0 | −.05 | .15 | .20 | .10 | 5.5 | 23.9 | .20 | .13 | .075 | .0307 |
| 23.0 | 18.0 | −.10 | .05 | .10 | .00 | 5.2 | 23.5 | ±.10 | .06 | .023 | .0305 |
| 24.0 | 18.0 | −.15 | −.05 | .00 | −.15 | 5.0 | 23.2 | −.15 | .09 | .028 | .0304 |
| 25.0 | 18.0 | −.20 | −.10 | −.10 | −.30 | 4.7 | 22.9 | −.30 | .18 | .150 | .0304 |
| 26.0 | 18.0 | −.25 | −.20 | −.20 | −.40 | 4.5 | 22.6 | −.40 | .26 | .325 | .0302 |
| 21.0 | 20.0 | .00 | .25 | .30 | .35 | 6.4 | 25.6 | .35 | .20 | .275 | .0320 |
| 22.0 | 20.0 | −.05 | .20 | .20 | .20 | 6.2 | 25.3 | .20 | .17 | .123 | .0318 |
| 23.0 | 20.0 | −.10 | .10 | .10 | .10 | 5.9 | 24.9 | ±.10 | .10 | .040 | .0317 |
| 24.0 | 20.0 | −.15 | .00 | .00 | −.05 | 5.7 | 24.6 | −.15 | .05 | .025 | .0315 |
| 25.0 | 20.0 | −.20 | −.05 | −.10 | −.20 | 5.4 | 24.3 | −.20 | .14 | .093 | .0315 |
| 26.0 | 20.0 | −.25 | −.15 | −.20 | −.30 | 5.2 | 24.0 | −.30 | .23 | .215 | .0314 |
| 24.0 | 22.0 | −.10 | .00 | .10 | .15 | 6.5 | 25.9 | .15 | .09 | .043 | .0323 |
| 25.0 | 22.0 | −.15 | −.05 | .00 | .00 | 6.2 | 25.6 | −.15 | .05 | .025 | .0323 |
| 26.0 | 22.0 | −.20 | −.15 | −.10 | −.10 | 6.0 | 25.3 | −.20 | .14 | .083 | .0322 |
| 23.0 | 23.0 | .05 | .10 | .20 | .40 | 7.1 | 26.9 | .40 | .21 | .233 | .0330 |
| 24.0 | 23.0 | .00 | .00 | .10 | .25 | 6.9 | 26.6 | .25 | .09 | .073 | .0328 |
| 25.0 | 23.0 | −.05 | −.05 | .00 | .10 | 6.6 | 26.3 | .10 | .05 | .015 | .0328 |
| 26.0 | 23.0 | −.10 | −.15 | −.10 | .00 | 6.4 | 26.0 | −.15 | .09 | .043 | .0327 |
| 27.0 | 23.0 | −.15 | −.20 | −.20 | −.10 | 6.1 | 25.6 | −.20 | .17 | .113 | .0325 |
| 28.0 | 23.0 | −.20 | −.30 | −.30 | −.30 | 5.9 | 25.3 | −.30 | .28 | .310 | .0324 |
| 25.0 | 24.0 | −.15 | .00 | .05 | .25 | 6.9 | 26.9 | .25 | .11 | .095 | .0333 |
| 26.0 | 24.0 | −.20 | −.10 | −.05 | .15 | 6.7 | 26.6 | −.20 | .13 | .075 | .0332 |
| 27.0 | 24.0 | −.25 | −.15 | −.15 | .00 | 6.4 | 26.2 | −.25 | .14 | .105 | .0330 |
| 24.0 | 25.0 | −.05 | .00 | .20 | .50 | 7.7 | 27.9 | .50 | .19 | .293 | .0348 |
| 25.0 | 25.0 | −.10 | −.05 | .10 | .35 | 7.4 | 27.6 | .35 | .15 | .145 | .0336 |
| 26.0 | 25.0 | −.15 | −.15 | .00 | .25 | 7.2 | 27.3 | .25 | .14 | .108 | .0335 |
| 27.0 | 25.0 | −.20 | −.20 | −.10 | .10 | 6.9 | 26.9 | −.20 | .15 | .100 | .0335 |
| 28.0 | 25.0 | −.25 | −.30 | −.20 | −.05 | 6.7 | 26.6 | −.30 | .20 | .195 | .0332 |
| 29.0 | 25.0 | −.30 | −.40 | −.30 | −.15 | 6.4 | 26.3 | −.40 | .29 | .363 | .0331 |
| 30.0 | 25.0 | −.35 | −.45 | −.45 | −.30 | 6.1 | 25.9 | −.45 | .39 | .617 | .0330 |
| 26.0 | 27.0 | −.15 | −.05 | .10 | .50 | 7.9 | 28.6 | .50 | .20 | .286 | .0345 |
| 27.0 | 27.0 | −.20 | −.10 | .00 | .40 | 7.6 | 28.2 | .40 | .18 | .210 | .0343 |
| 28.0 | 27.0 | −.25 | −.20 | −.10 | .20 | 7.4 | 27.9 | −.25 | .19 | .153 | .0342 |
| 29.0 | 27.0 | −.30 | −.30 | −.20 | .05 | 7.1 | 27.6 | −.30 | .21 | .223 | .0342 |
| 30.0 | 27.0 | −.35 | −.30 | −.05 | | 6.8 | 27.2 | −.35 | .26 | .339 | .340 |
| 27.0 | 28.0 | −.20 | −.10 | .08 | .55 | 8.0 | 28.9 | .55 | .23 | .358 | .0348 |
| 28.0 | 28.0 | −.25 | −.20 | −.02 | .35 | 7.8 | 28.6 | .35 | .21 | .226 | .0347 |
| 29.0 | 28.0 | −.30 | −.30 | −.12 | .20 | 7.5 | 28.3 | −.30 | .23 | .234 | .0347 |
| 30.0 | 28.0 | −.35 | −.35 | −.22 | .10 | 7.2 | 27.9 | −.35 | .23 | .305 | .0345 |
| 31.0 | 28.0 | −.42 | −.45 | −.32 | .00 | 7.1 | 27.6 | −.45 | .30 | .483 | .0342 |
| 28.0 | 30.0 | −.25 | −.10 | .15 | .60 | 8.5 | 29.8 | .60 | .28 | .455 | .0355 |
| 30.0 | 30.0 | −.35 | −.25 | −.10 | .10 | 7.9 | 29.1 | −.35 | .20 | .312 | .0353 |
| 32.5 | 30.0 | −.50 | −.45 | −.30 | .05 | 7.7 | 28.4 | −.50 | .33 | .545 | .0345 |

From the data reproduced above and other available data the curves illustrated in FIGS. 1 and 2 have been produced. In FIG. 1 the coordinates lying between the curves designated A and B represent the broad compositional range of the two alloys. For example, as shown in FIG. 1, when the copper content of the negative leg is about 4.5% the iron content of the positive leg may vary between about 6% and 15%. On the other hand, when the iron content of the positive leg is about 15% the copper content of the negative leg may lie within the range of about 4.5% to 7.5%. These values represent the lower end of the range for the iron and copper contents in the positive and negative legs, respectively. Curves A and B in FIG. 1 also shows that the maximum iron and copper content of the two alloys is about 29% and 28%, respectively.

The configuration and location of curves A and B in FIG. 1 in relation to the coordinates thereon were arrived at by selecting thermocouples where "$\Sigma e^2$" was used as the deciding factor on the acceptable compositional limits because it provided a sensitive method of selecting a range of compositions which most uniformly approached zero output at temperatures below and including 500° F.

All of the alloys for the positive and negative legs of the thermocouple lying between curves A and B are those in which "$\Sigma e^2$" does not exceed about 0.20 and in which, therefore "$e_{max}$" does not exceed about ±0.45 mv. (about ±15° F. for a thermocouple operating above about 1,000° F.) and "$e_{avg}$" does not exceed about 0.22 mv. (about 7½° F. for such a thermocouple).

A narrower compositional range for the alloys forming the two legs of the thermocouple is obtained when "$\Sigma e^2$" is limited to 0.1. These alloys are those having coordinates lying between the curves C and D in FIG. 1. Within this narrower range of compositions "$e_{max}$" is less than the corresponding "$e_{max}$" of those thermocouples whose composition falls between curves A and C or D and B, and in particular "$e_{max}$" does not exceed about ±0.32 mv. (about ±10° F. for a thermocouple operating at about 1,600° F.), and "$e_{avg}$" does not exceed about 0.16 mv. (about 5° F. for such a thermocouple). Thus, referring to Table I, if the positive thermoelement contains 12.5% iron and the negative thermoelement contains 5% copper "$e_{avg}$" is about 0.10 mv. and "$e_{max}$" is ±0.15 mv. On the other hand, in the thermocouple in which the positive and negative thermoelements contain about 16% iron and 5% copper, respectively, "$e_{avg}$" is 0.20 mv. and "$e_{max}$" is −0.30 mv.

Curve E in FIG. 1 represents the composition of optimum alloys for the positive and negative thermoelements considered primarily from the standpoint of a low millivolt output up to 500° F. Curve F in FIG. 1 represents the millivolt output at 1,600° F. for thermocouples having a composition lying on curve E.

In FIG. 2 the same curve E shown in FIG. 1 is reproduced for reference purposes since the other curves shown in FIG. 2 represent characteristics of thermocouples defined by curve E. Curve G in FIG. 2 represents "$e_{avg}$" for thermocouples the positive and negative legs of which lie on curve E. Curve H in a sense is similar to curve G but represents "$e_{avg}$" expressed in °F. rather than in millivolts.

For the purposes of this invention curve H may also be interpreted as showing that if the thermocouple measuring junction is operating at 1,000°-1,600°F. and the lead wire-thermocouple junction is at a uniform temperature of 500° F. or lower, the average apparent error in the measuring junction attributable to mismatch in emf between the thermocouple and a pair of thermoelectrically like lead wires such as annealed copper wires lies in the range from slightly less than 2° F. to slightly more than 6° F. In many applications including the aforementioned catalytic converter, errors of that size may for various reasons be considered insignificant. Thus, the lead wires for such thermocouples can be made of ordinary inexpensive materials, such as copper, iron or aluminum.

Curve I in FIG. 2 represents the Seebeck coefficient for thermocouples the compositions of which lie on curve E. Curve I illustrates the fact that the sensitivity of the thermocouple to changes in temperature, as represented by the Seebeck coefficient, increases by nearly 60% from about 0.022 at 5% copper to about 0.035 at 28% copper in the negative thermoelement.

The lower limit of 5% copper is determined by various required characteristics of the alloys. Below about 5% copper in the negative thermoelement of thermocouples represented by curve E the 1,600° F. output and the Seebeck coefficient fall off sharply and are relatively more sensitive to variations in copper content that may occur in the preparation and use of the alloys. Likewise, below about 11½% iron in the positive thermoelement the 1,600° F. output is relatively more sensitive to analogous variations in iron content.

In Table II there is set forth a series of four thermocouples designated as A, B, C and D. The positive and negative legs of each of these thermocouples fall approximately on curve E in FIGS. 1 and 2. Each of these thermocouples has important individual features. For example, thermocouple A has the highest oxidation resistance and a good output and Seebeck coefficient above about 1,000°F. Thermocouple B is slightly less oxidation resistant than thermocouple A; however, it has a higher Seebeck coefficient and a substantially higher output at 1,600°F. and produces slightly smaller average error than thermocouple A at lead wire-thermocouple junction temperatures up to about 500°F. In addition thermocouple B is less sensitive than thermocouple A with respect to the Seebeck coefficient and output at 1,600°F. in relation to variations in the iron and copper contents of the positive and negative thermoelements, respectively. Thermocouple C is less oxidation resistant than thermocouples A and B. However, it has a higher output and a higher Seebeck coefficient. It also produces a substantially smaller average error. Thermocouple D has the lowest resistance to oxidation of the four thermocouples listed. However, thermocouple D has the highest Seebeck coefficient, a very high output and produces the lowest average error. If this thermocouple is protected from oxidation in its high temperature zone by an air-tight, oxidation resistant sheath, oxidation is not of great importance as a source of thermocouple deterioration.

Within the range of composition represented by the four thermocouples of Table II, compositions lying toward the right along curve E tend to exhibit higher output in the operating range above 1,000°F., higher sensitivity to temperature changes in that range (higher Seebeck coefficient) and smaller average errors at lead wire-thermocouple junction temperatures up to 500°F. when used with pairs of thermoelectrically equal wires. On the other hand, compositions lying toward the left along curve E tend to exhibit higher oxidation resistance and may be better adapted for use in environments where oxidation may seriously affect thermocouple performance.

TABLE II

| | Thermoelement Combination | | Average Error (avg.) | | Average Seebeck Coefficient (Mv/°F) from 1000–1600°F. | Output at 1600°F. Mv. |
|---|---|---|---|---|---|---|
| | Positive | Negative | Mv | °F | | |
| A | 11½% FeNi | 5% CuNi | .11 | 5. | .021 | 16. |
| B | 20% FeNi | 10% CuNi | .10 | 4. | .026 | 20 |
| C | 22% FeNi | 15% CuNi | .07 | 2.5 | .029 | 21.9 |
| D | 25% FeNi | 23% CuNi | .05 | 1.5 | .033 | 26.3 |

In FIG. 3 curves J, K, L and M are the respective emf vs. temperature curves for commercially available thermocouples of the iron/constantan, Chromel/Alumel, tungsten/tungsten 26% rhenium and platinum 10% rhodium/platinum types. Curve N is the emf vs. temperature curve corresponding closely to thermocouple C in Table II, and curve O is the emf vs. temperature curve of thermocouple D in Table II. These curves illustrate graphically the relatively high output of thermocouples C and D in the range of 1,600° F., the relatively high sensitivity thereof and the relatively low output of these thermocouples at 500° F. and below, which is the temperature range typical of lead wire-thermocouple junctions.

While the negative leg of the thermocouple consists essentially of copper and nickel and the positive leg consists of iron and nickel, nevertheless each of these alloys may contain a small amount of other elements. For example, in the melting of these alloys small amounts (normally not more than about 0.10% each) of deoxidizers such as carbon, manganese, aluminum, silicon, zirconium, alkaline earth and rare earth metals may be added for deoxidation purposes. Likewise, small amounts of other alloying elements, totaling less than about 5%, may be added to either or both of the alloys to improve or modify specific characteristics thereof, such as to increase the emf at elevated temperatures or to balance the emf of the other alloy at lower temperatures or to improve the alloys' resistance to oxidation or their behavior in a reducing atmosphere. Such other alloy additions may be in the nature of molybdenum, chromium, manganese, silicon, carbon, cobalt, iron or aluminum.

We claim:

1. A thermocouple having an electropositive element and an electronegative element, the compositions of said two elements falling within the range of coordinates lying between curves A and B in FIG. 1.

2. A thermocouple as called for in claim 1 wherein the compositions of the two elements fall within the range of coordinates lying between curves C and D in FIG. 1.

3. A thermocouple as called for in claim 1 wherein the compositions of the two elements correspond essentially to the coordinates in FIG. 1 which define curve E.

4. A thermocouple as called for in claim 1 wherein, based upon a reference temperature of 32° F., the thermocouple produces at temperatures from 32° F. to 400° F. a maximum emf output of not more than about ±0.45 millivolts and produces a substantially uniformly increasing output from 1,000° F. to 1600° F.

5. A thermocouple as called for in claim 4 wherein, based upon a reference temperature of 32° F., the thermocouple produces at temperatures from 32° F. to 400° F. an average of absolute values of emf output of not more than about 0.22 millivolts.

6. A thermocouple as called for in claim 1 wherein the thermocouple has an average Seebeck coefficient between 1,000° F. and 1,600° F. of at least about 0.02.

7. A thermocouple as called for in claim 4 wherein the thermocouple has an average Seebeck coefficient between 1,000° F. and 1,600° F. of at least about 0.030.

8. A thermocouple as called for in claim 1 wherein, based upon a reference temperature of 32°F., the thermocouple produces at temperatures from 32°F. to 400°F. a maximum emf output of not more than about ±0.45 millivolts.

9. A thermocouple as called for in claim 8 wherein, based upon a reference temperature of 32°F., the thermocouple produces at temperatures from 32°F. to 400°F. an average of absolute values of emf output of not more than about 0.22 millivolts.

10. A thermocouple as called for in claim 1 wherein said positive element consists of an iron-nickel alloy containing from about 17% to 23% iron, not more than a total of about 5% of other alloying elements and the balance essentially nickel and the negative element consists of a copper-nickel alloy containing about 8.5% to 12% copper, not more than a total of about 5% of other alloying elements and the balance essentially nickel.

11. A thermocouple as called for in claim 2 wherein said positive element consists of an iron-nickel alloy containing from about 18% to 21.5% iron, not more than a total of about 5% of other alloying elements and the balance essentially nickel and the negative element consists of a copper-nickel alloy containing about 9% to 11% copper, not more than a total of about 5% of other alloying elements and the balance essentially nickel.

12. A thermocouple as called for in claim 1 wherein said positive element consists of an iron-nickel alloy containing from about 22% to 28% iron, not more than a total of about 5% of other alloying elements and the balance essentially nickel and the negative element consists of a copper-nickel alloy containing about 20% to 25% copper, not more than a total of about 5% of other alloying elements and the balance essentially nickel.

13. A thermocouple as called for in claim 2 wherein said positive element consists of an iron-nickel alloy containing from about 23% to 27% iron, not more than a total of about 5% of other alloying elements and the balance essentially nickel and the negative element consists of a copper-nickel alloy containing about 22% to 24% copper, not more than a total of about 5% of other alloying elements and the balance essentially nickel.

14. A thermocouple as called for in claim 1 including a pair of lead wires substantially extending from the free ends of said thermoelements, said lead wires being substantially alike thermoelectrically in the temperature range of 32°F. to 400°F.

15. A thermocouple as called for in claim 14 wherein the lead wires consist of a material selected from the group consisting of essentially copper, aluminum, iron and steel.

16. A thermocouple as called for in claim 14 wherein said thermoelements are relatively short in comparison to the length of the lead wires.

17. In an internal combustion engine the combination of a catalytic converter in the exhaust system of the engine, a thermocouple in said converter, said thermocouple having an electropositive element and an electronegative element, the compositions of said two elements falling within the range of coordinates lying between curves A and B in FIG. 1, said elements being connected to a device operable in response to the emf produced by the thermocouple.

18. The combination called for in claim 17 wherein, based upon a reference temperature of 32°F., said thermocouple produces at temperatures from 32°F. to 400°F. a maximum emf output of not more than about ±0.45 millivolts.

19. The combination called for in claim 18 wherein, based upon a reference temperature of 32°F., the thermocouple produces at temperatures from 32°F. to 400°F. an average of absolute values of emf output of not more than about 0.22 millivolts.

20. The combination called for in claim 18 wherein the free ends of said thermoelements extend exteriorly of said converter and lead wires which are substantially alike thermoelectrically in the temperature range of 32°F to 400°F. extend from the free ends of the thermoelements to said device.

21. The combination called for in claim 20 wherein the junction between the free ends of the thermoelements and the lead wires is disposed at a location where the ambient temperature thereof does not exceed 400°F.

22. The combination called for in claim 17 wherein the free ends of said thermoelements extend exteriorly of the converter and lead wires which are substantially alike thermoelectrically in the temperature range of 32°F. to 500°F. extend from the free ends of the thermoelements to said device.

23. The combination called for in claim 22 wherein the junction between the free ends of the thermoelements and the lead wires is disposed at a location where the ambient temperature thereof does not exceed 500°F.

24. The combination called for in claim 22 wherein, based upon a reference temperature of 32°F., said thermocouple produces at temperatures from 32°F. to 500°F. a maximum emf output of not more than about ±0.45 millivolts and produces substantially uniformly increasing output from 1,000° to 1,600°F.

25. The combination called for in claim 24 wherein, based upon a reference temperature of 32°F., said thermocouple produces at temperatures from 32°F. to 500°F. an average of absolute values of emf output of not more than about 0.22 millivolts.

* * * * *